United States Patent [19]
Nagle et al.

[11] Patent Number: 5,823,063
[45] Date of Patent: Oct. 20, 1998

[54] SHIFT COLUMN CABLE ASSEMBLY

[75] Inventors: J. Martin Nagle, Royal Oak; David Van Zanten, Troy, both of Mich.

[73] Assignee: Nagle Industries, Inc., Clawson, Mich.

[21] Appl. No.: 812,797

[22] Filed: Mar. 6, 1997

Related U.S. Application Data

[62] Division of Ser. No. 510,542, Aug. 2, 1995, Pat. No. 5,655,415.

[51] Int. Cl.⁶ ........................................ F16C 1/10
[52] U.S. Cl. .................. 74/502.6; 74/502.4; 74/501.5 R
[58] Field of Search ................ 74/500.5–502.6; 403/176, 169, 171, 348, 319, 326, 14, 133, 140, 122, 115, 135, 27, 37, 132

[56] References Cited

U.S. PATENT DOCUMENTS

| | | |
|---|---|---|
| 2,859,060 | 11/1958 | Davies et al. . |
| 2,999,708 | 9/1961 | Dudash . |
| 3,224,801 | 12/1965 | Price-Stephens et al. . |
| 3,378,284 | 4/1968 | Blanchard, Jr. . |
| 3,759,555 | 9/1973 | Ito . |
| 4,118,131 | 10/1978 | Schnitzius . |
| 4,231,673 | 11/1980 | Satoh et al. ............................ 403/125 |
| 4,348,348 | 9/1982 | Bennett et al. . |
| 4,410,295 | 10/1983 | Ersoy et al. ............................ 403/122 |
| 4,568,216 | 2/1986 | Mizusawa et al. ..................... 403/143 |
| 4,590,819 | 5/1986 | Spease et al. . |
| 4,601,603 | 7/1986 | Nakayama ............................. 403/143 |
| 4,758,110 | 7/1988 | Ito ......................................... 403/140 |
| 4,887,930 | 12/1989 | Chaczyk et al. ....................... 403/379 |
| 5,161,428 | 11/1992 | Petruccello .................... 74/501.5 R X |
| 5,241,879 | 9/1993 | Kelley .................................. 74/502.4 |
| 5,265,495 | 11/1993 | Bung et al. ........................... 74/502.6 |

*Primary Examiner*—Vinh T. Luong
*Attorney, Agent, or Firm*—Dinnin & Dunn, P.C.

[57] ABSTRACT

A connector for connecting a cable strand to a ball stud. The connector includes a body and a socket formed in the body. The socket includes a pair of lever arms and a pair of bosses. The lever arms include lock projections used to retain the ball stud in the socket.

2 Claims, 12 Drawing Sheets

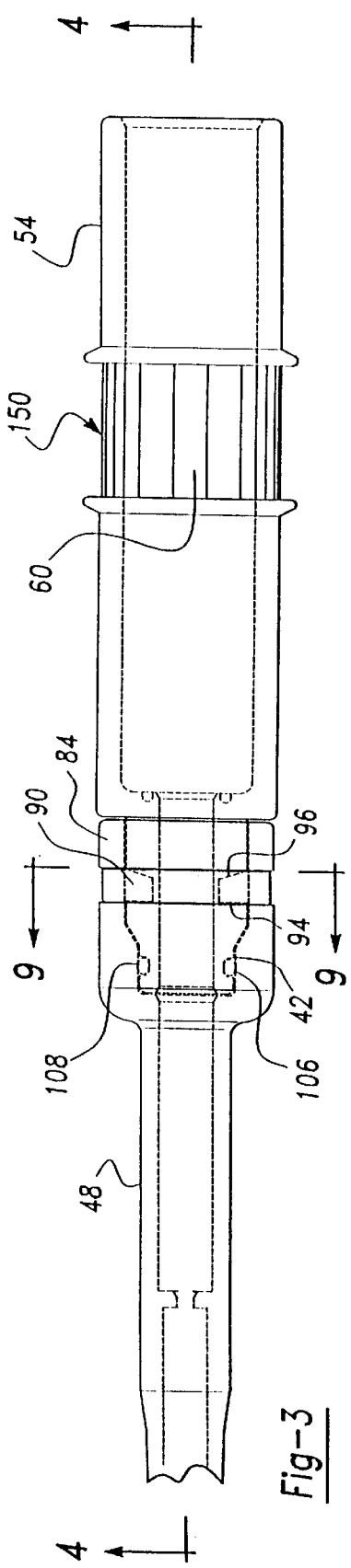
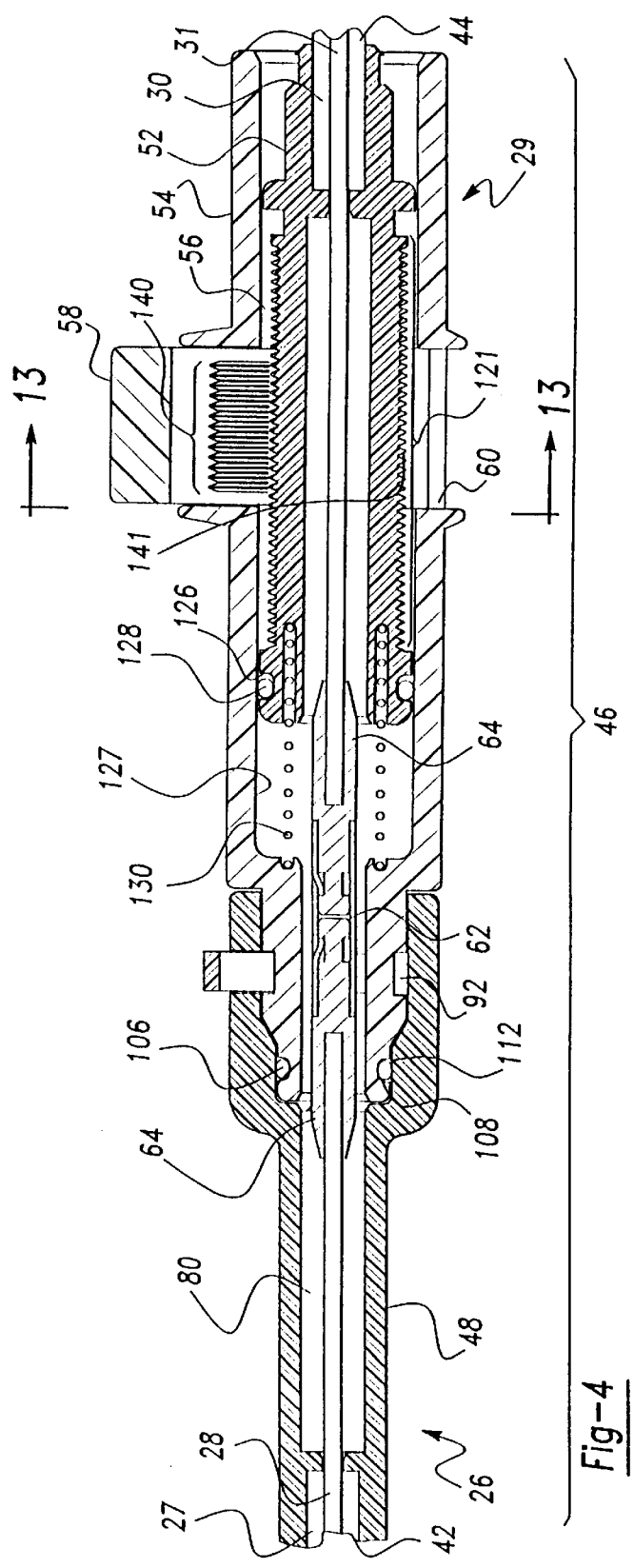

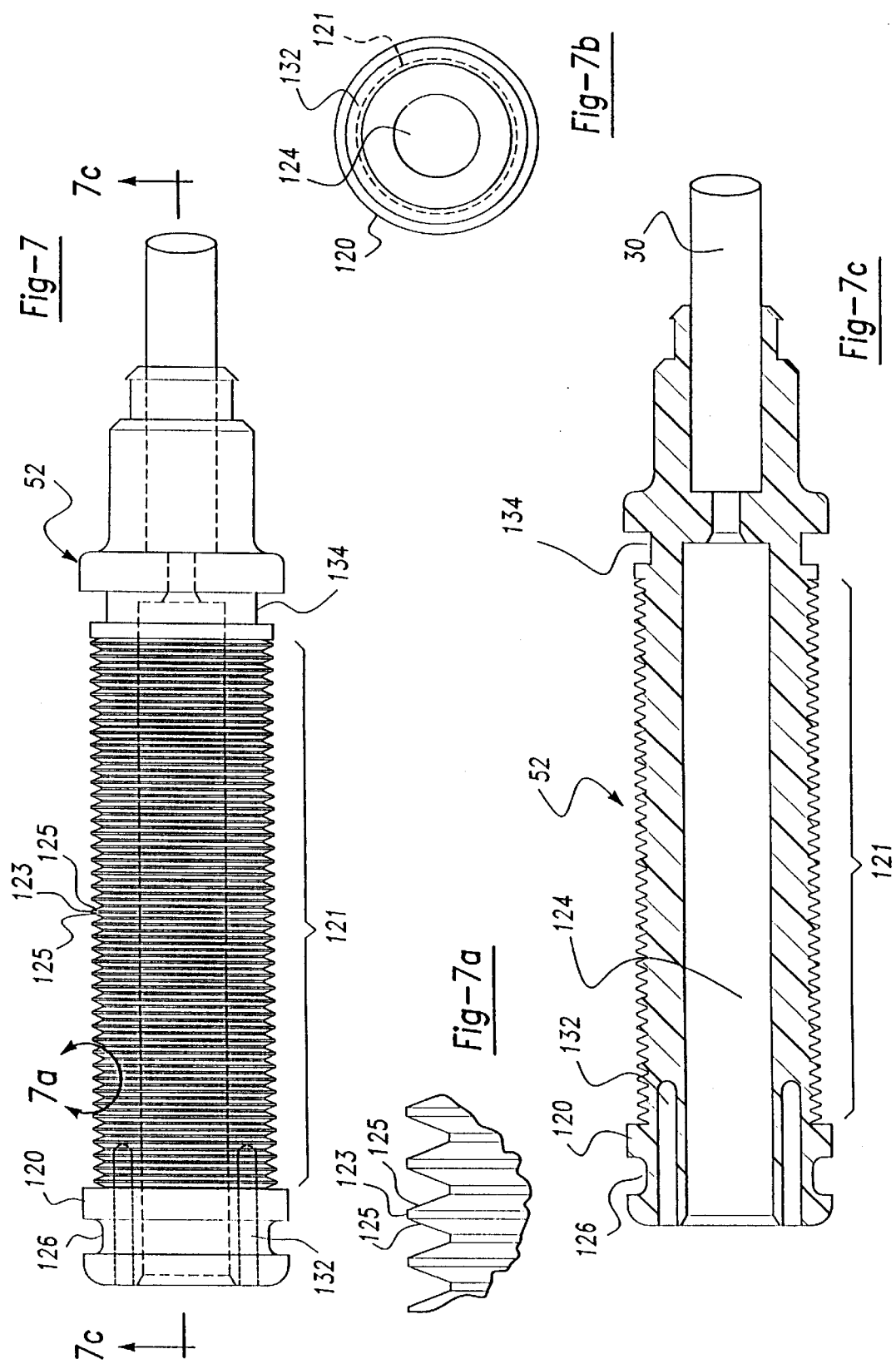

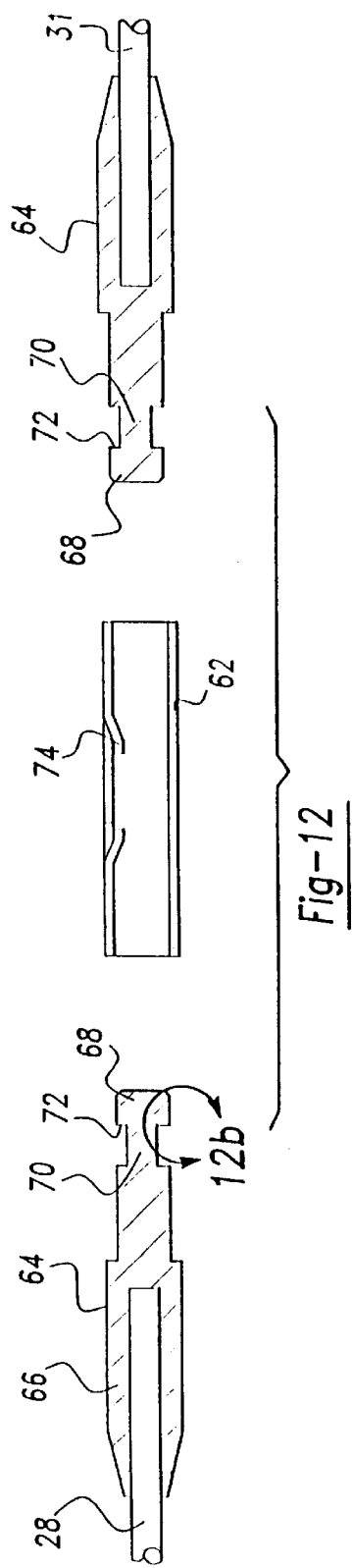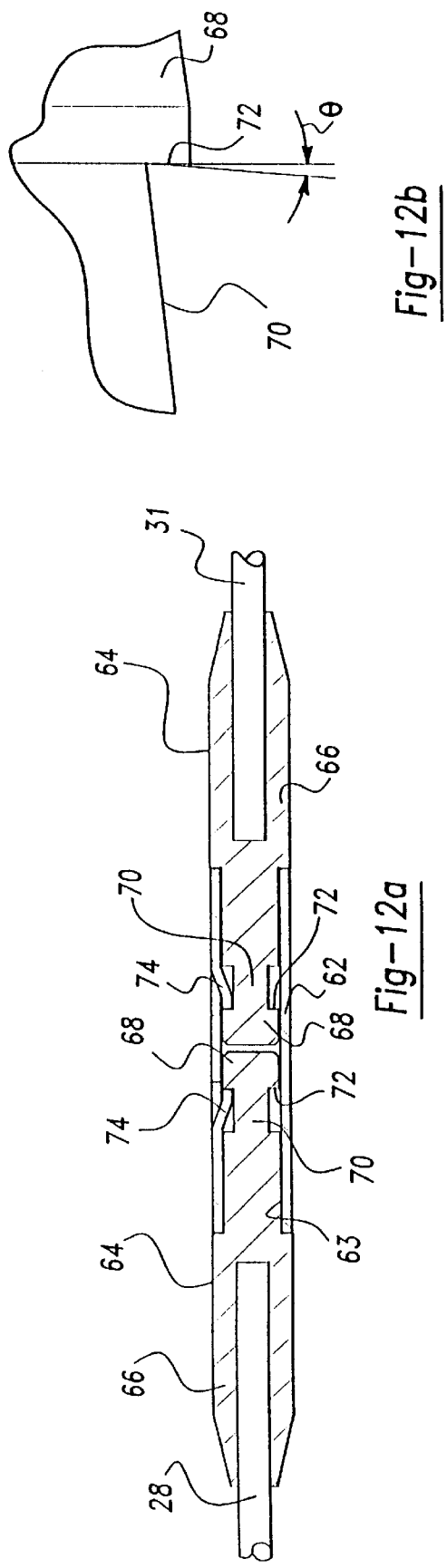

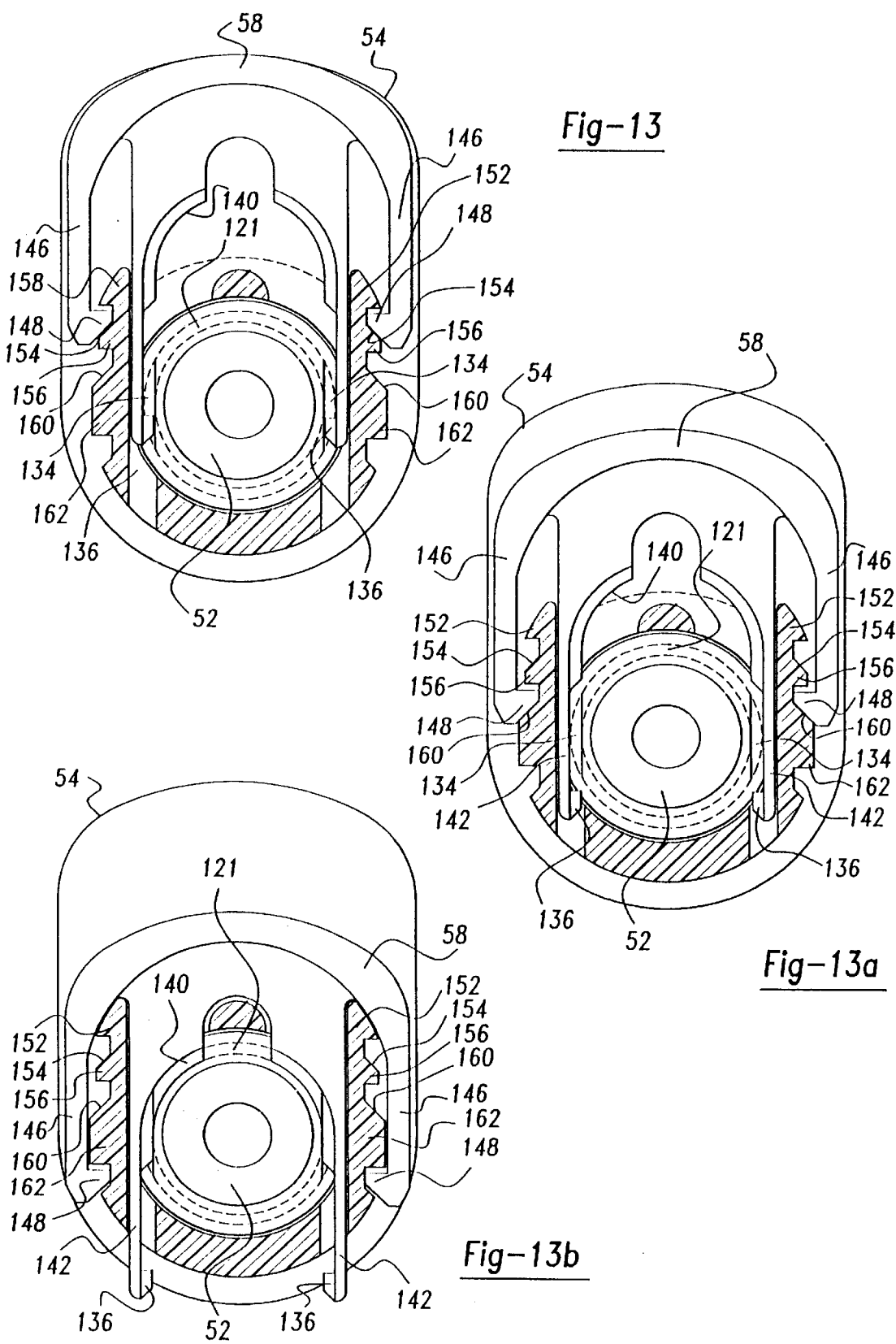

SHIFT COLUMN CABLE ASSEMBLY

This is a division of the U.S. Pat. application Ser. No. 08/510,542 filed Aug. 2, 1995 now U.S. Pat. No. 5,655,415.

BACKGROUND OF THE INVENTION

1. Field of the Invention

The invention relates to a cable assembly, and more particularly, to a two-piece assembly having an adjustment feature to adjust the effective length of the cable.

2. Description of the Related Art

Cable assemblies typically include a conduit and a core member in the form of a stranded wire cable or cable strand extending within the conduit. In use, the cable strand is attached at one end to a remote member; for example, a transmission control arm, and is connected at the opposite end to an actuation member such as a vehicle shift lever. The connection is such that movement of the actuation member is transmitted through the cable strand and results in corresponding actuation or movement of the remote member. A cable assembly may be used in a motor vehicle to enable a vehicle operator to engage or disengage a vehicle transmission.

It is important that the relative position of the actuation member and the remote member be maintained; i.e., if the shift lever is placed in neutral, it is imperative that the vehicle transmission also be placed in neutral. During installation of a cable assembly, proper positioning of the respective parts is obtained by adjusting the overall length of the cable. This may be accomplished in one of two ways. First, the overall length of the cable strand itself may be adjusted, or second, the overall length of the conduit may be adjusted, which in effect, adjusts the length of the cable strand; i.e., increasing the length of the conduit shortens the cable strand.

Installation of a transmission shift cable during vehicle assembly is a tedious and time-consuming procedure. Normally, the cable assembly is attached to the transmission on one end thereof The opposite end, which is to be attached to the vehicle shift lever, is left hanging on the vehicle chassis adjacent the transmission. Assembly of most modern automobiles takes place in a two-part process. The power train and chassis are assembled separate from the vehicle body and interior. The two main subassemblies of the vehicle are finally assembled or married in a final vehicle assembly plant. Thus, the transmission cable is attached to the chassis but remains loose until final assembly procedures. During final assembly, the cable assembly must be threaded through the various vehicle components prior to being attached to the vehicle firewall and ultimately to the shift lever. Once connected, the cable must be adjusted to maintain and properly position the relative components; i.e., the transmission control arm and the shift lever. Such a procedure increases vehicle assembly time and thus reduces corresponding vehicle production.

A further difficulty exists in that any connection made to couple the transmission control arm to the shift lever must be made with less than a four-pound connection force to maintain the respective parts in their proper positions. Any increase in assembly force generates a risk that either the shift lever is moved from its proper position, typically neutral during assembly, or the transmission is shifted from neutral into one of the drive gears.

SUMMARY OF THE INVENTION

Accordingly, the present invention is a unique cable assembly formed of two portions which are joined to form a complete assembly. The two portions may be joined with less than the mandated four-pound connection force. Each portion is independently mounted and secured to the respective vehicle chassis and vehicle body prior to final assembly. The cable assembly, according to the present invention, enables an operator during final assembly to connect the two portions and release an automatic adjustment feature which provides the necessary length adjustment and thus reduces assembly time and increases vehicle production.

In general the cable assembly includes a transmission sub assembly portion and a shift lever sub assembly portion. A terminal rod fitting is connected to one end of each of the respective sub assembly portions and is used to connect the respective portions to either the shift lever or transmission control arm. The remaining ends of the cable assembly are joined by a connector assembly during final assembly. The connector assembly includes a pair of joint end fittings each attached to respective ends of the cable strand. During assembly, the joint end fittings are connected via a coupling joint. The respective conduit ends are connected by a coupling end fitting connected to one end of the conduit and a slider end fitting, attached to the conduit of the opposite portion. The slider end fitting is slidably disposed within a housing connector. The housing connector and coupling end fitting are connected and held in place by a coupling clamp.

A further aspect of the invention includes a lock means cooperating with the housing connector to prevent relative movement between the slider end fitting and the housing connector. In the preferred form, the lock means engages the slider end fitting to maintain proper adjustment of the conduit. In addition, the lock means acts to hold the slider end fitting in a shipping position; i.e., a position prior to final vehicle assembly. Upon disengaging the lock means from the shipping position, the slider end fitting is released. Action of a spring causes the slider end fitting to move longitudinally relative to the housing connector to automatically adjust the conduit and corresponding cable strand. Once the cable strand is properly adjusted, the lock means engages the slider end fitting and prevents relative movement to maintain the slider end fitting in the adjusted position.

A second aspect of the invention is a terminal rod fitting used to attach the cable strand to the control arm of the transmission and to the shift lever. In general, the terminal rod fitting includes an inner flexible lever arm which deflects outward to accept a ball stud. The flexible lever arm provides a low installation force while maintaining a high retention force to prevent the ball stud from being withdrawn from the terminal rod fitting.

BRIEF DESCRIPTION OF THE DRAWINGS

FIG. 3 is a top view of the connector assembly, including a housing and coupling end fitting, of the cable assembly of FIG. 2 with portions removed for clarity.

FIG. 4 is a longitudinal sectional view taken along lines 44 of the connector assembly, including the housing and coupling end fitting, of the cable assembly of FIG. 2.

FIG. 7 is a top view of a slider end fitting of the cable assembly of FIG. 2.

FIG. 7a is an enlarged view of the area shown in circle 7a of FIG. 7.

FIG. 7b is an end view of the slider end fitting taken from the left side of FIG. 7.

FIG. 7c is a sectional view taken along lines 7c—7c of FIG. 7.

FIG. 12 is an exploded fragmentary sectional view of the joint end fittings and coupling joint of the cable assembly of FIG. 2.

FIG. 12a is a fragmentary sectional view of the assembled joint end fitting and coupling joint of FIG. 12.

FIG. 12b is an enlarged view of a portion of the area shown in circle 12b of FIG. 12.

FIG. 13 is a sectional view taken along lines 13—13 of FIG. 4 illustrating the locking clip in a pre-assembly position.

FIG. 13a is a sectional view illustrating the locking clip in an adjustment position.

FIG. 13b is a sectional view taken along lines 13—13 of FIG. 4 illustrating the locking clip in an engaged or locked position.

DESCRIPTION OF THE PREFERRED EMBODIMENT(S)

Figure 1:
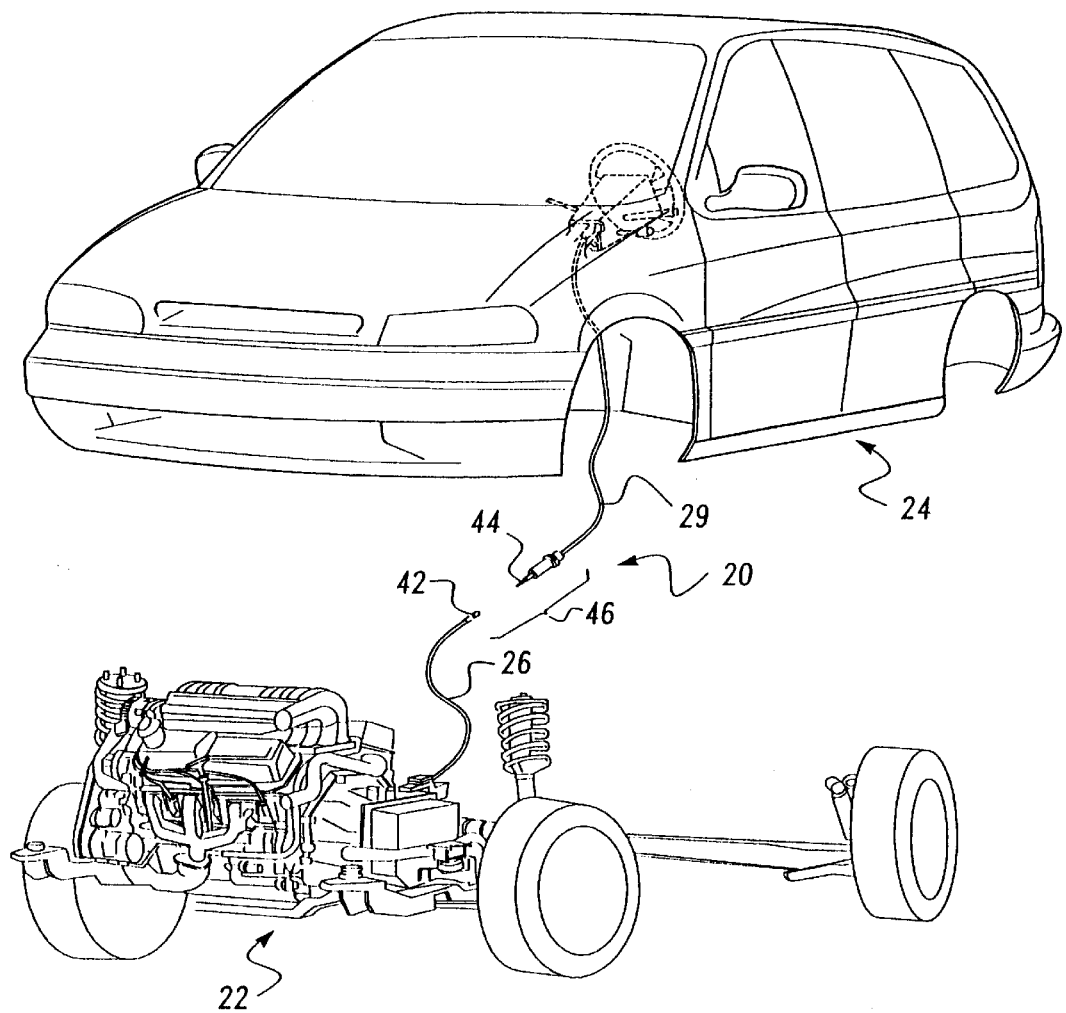
FIG. 1 is a perspective view of a vehicle assembly utilizing a cable assembly according to the present invention.
Figure 2:
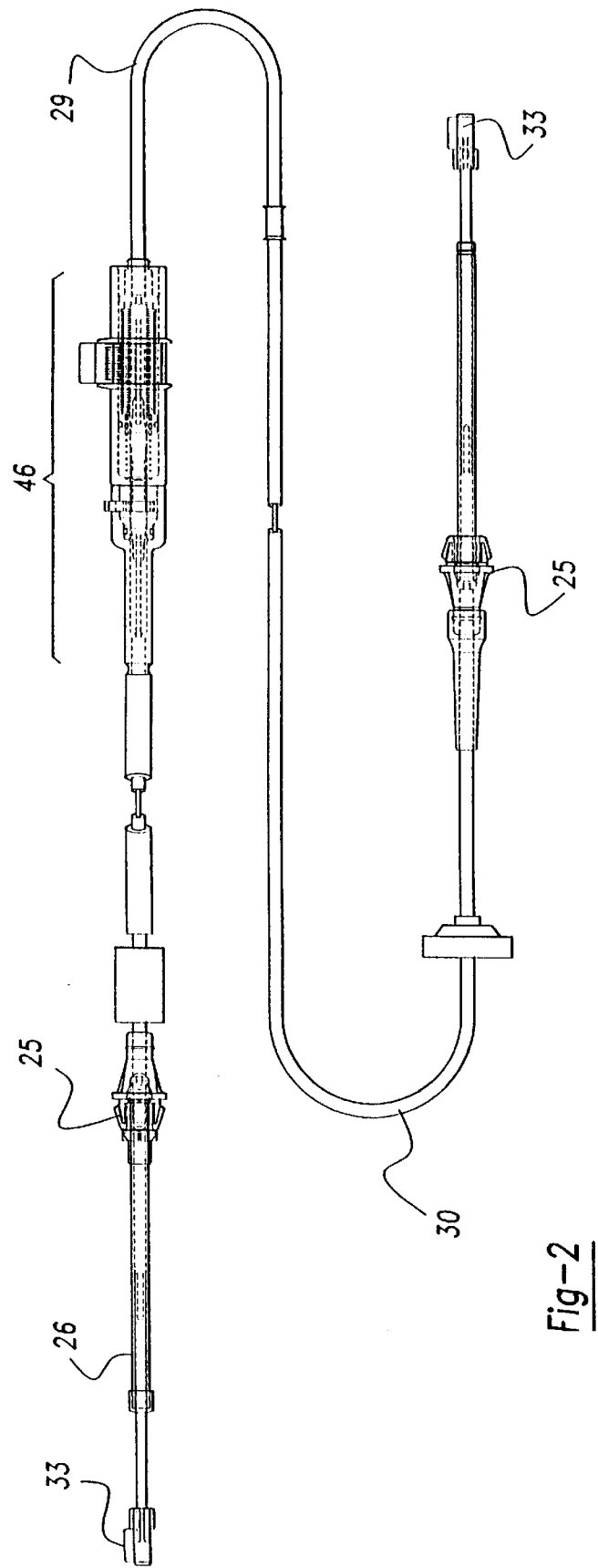
FIG. 2 is an elevational view of a cable assembly according to the present invention with portions removed for clarity.

Referring to the drawings, and more particularly to FIGS. 1 and 2 thereof, a cable assembly, seen generally as 20, is shown for use in connecting a control arm of a vehicle transmission, mounted to a vehicle chassis 22, to a shift lever located in a vehicle body 24. As illustrated, the cable assembly 20 is a two-piece assembly having a transmission portion 26 and a shift lever portion 29. The transmission portion includes a conduit 27 and cable strand 28 disposed therein for movement relative the conduit 27. The shift lever portion 29 also includes a conduit 30 and a cable strand 31 disposed therein for movement relative the conduit 30. A terminal rod fitting 33 mounted on one end of the cable strand 28 of the transmission portion 26 is used to connect the transmission portion 26 to the control arm of the vehicle transmission (not shown). A second terminal rod fitting 33 is connected to one end of the cable strand 31 of the shift lever portion 29 and is used to connect the shift lever portion 29 to the shift lever arm (not shown) in the vehicle body 24. The transmission portion 26 is mounted to the vehicle transmission via a connector 25 having a bayonet or twist and lock-style connection which attaches the transmission portion 26 to the transmission. Additionally, the shift lever portion 29 is attached via the same or similar type of bayonet or twist and lock-type connector 25 to the vehicle firewall which holds the shift lever portion 29 of the cable assembly 20 in position.

By making the control cable assembly 20 as a two-piece assembly, the respective portions may be shipped independently to various vehicle assembly or build areas, wherein as set forth above, each portion 26, 29 of the cable assembly 20 may be separately installed. During final assembly, the operator need simply connect the two free ends 42, 44 of the transmission portion 26 and shift lever portion 29 with the connector assembly 46 cable and actuate the connector assembly 46 enabling an automatic adjustment feature to remove any slack and provide appropriate tension in the cable strand. This can be accomplished in a greatly reduced time from that previously required to assemble and connect a cable to the shift lever.

Turning now to FIGS. 3 and 4, a connector assembly, generally seen at 46, is shown for use in connecting the respective free ends 42, 44 of the transmission portion 26 and the shift lever portion 29 of the cable assembly 20. The transmission portion 26 includes a coupling end fitting 48 connected to the free end 42 of the conduit 27 (see FIG. 5a). A slider end fitting 52 is connected to the free end 44 of the shift lever portion 29. Both connections are normally molded; i.e., the fittings are molded directly over the conduit to provide a secure and sealed connection. A housing connector 54, having a passageway 56 therein, slidably receives the slider end fitting 52 and allows relative longitudinal movement to occur between the two respective parts. A locking clip 58 disposed within a slot 60, transverse the passageway 56, is operative to prevent relative longitudinal movement between the slider end fitting 52 and the housing connector 54. The above elements of the connector assembly 46 will be set forth in greater detail below.

The cable strands 28, 31 are connected by coupling joints 62. As illustrated in FIG. 4 and more fully in FIGS. 12–12B, the end of each cable strand 28, 31 includes a joint end fitting 64. The joint end fittings 64 are identical in nature and thus only one will be described. The joint end fitting 64 includes a body portion 66 which is attached to the cable strand through conventional means.; e.g., crimping. A head portion 68 extends outward from the body portion 66. A reduced diameter neck portion 70; i.e., the overall diameter or size of the neck portion 70 is less than that of the head portion 68. While the joint end fitting is disclosed herein as having a cylindrical shape or a circular cross-section, it is possible to use other shapes or cross-sections such as square, hexagon or other polygons. As illustrated in FIG. 12b, a shoulder 72 is formed between the neck 70 and the head portion 68, The shoulder 72 is inclined at an angle θ toward the neck portion. In the preferred embodiment, the angle of inclination is approximately four degrees.

The joint end fittings are connected by a coupling joint 62. The coupling joint 62 is a cylindrical member having an inner diameter or opening slightly greater than the outer diameter or size of the head 68 of the joint end fitting 64. The coupling joint 62 includes a pair of inwardly extending resilient detent fingers 74. Once again, the coupling joint 62 may take any shape as long as it is complementary to that of the joint end fitting 64.

In the preferred form, insertion of the joint end fitting 64 into the coupling joint 62 causes the head portion 68 to engage the detent finger 74 and deflect it outward. The resiliency of the detent finger 74 is such that an axial installation force of four pounds or less will be sufficient to deflect the fingers 74. Once the head portion passes the end of the detent finger 74, the finger snaps inwardly along the neck portion 70. When the cable strand 28 is pulled outward, i.e., tension is applied to the strand, the end of the detent finger 74 engages the shoulder 72 and prevents withdrawal of the joint end fitting 64 from the coupling joint 62. As shown in FIG. 12a, once the respective joint end fittings 64 are locked in position on the coupling joint 62, the cable strands 28, 31 function effectively as a one-piece cable. The inclination of the shoulder 72 causes the detent finger 74 to be pulled inward toward the neck 70 upon application of tension to the cable strand 28, 31. Thus, as the tensile force is applied, the finger 74 is drawn radially inwardly towards the neck portion 70 which increases coupling force. Thus, the tensile force acts axially on the detent finger 74 rather than radially. It should be appreciated that the removal of the joint end fitting 64 from the coupling joint 62 is accomplished by urging the joint end fitting 64 forward allowing the detent finger 74 to be lifted upward until it clears the shoulder 72 after which the joint end fitting 64 may be withdrawn.

Figure 5:
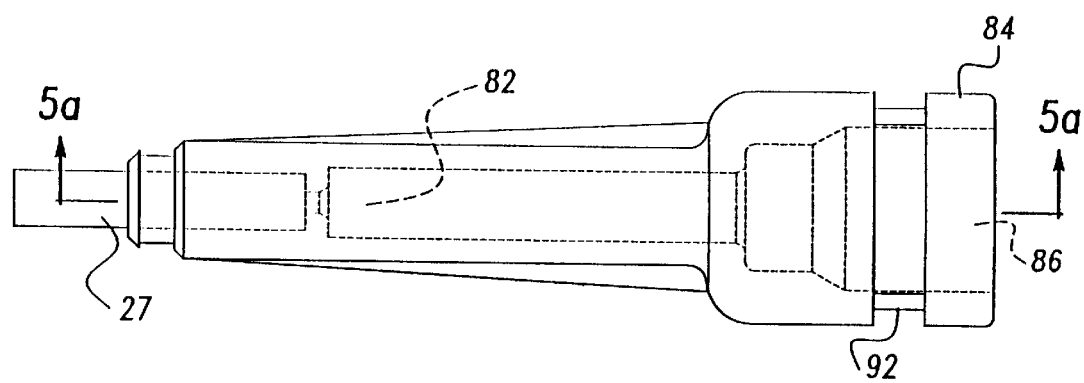
FIG. 5 is a top view of a coupling end fitting of the cable assembly of FIG. 2.
Figure 5A:
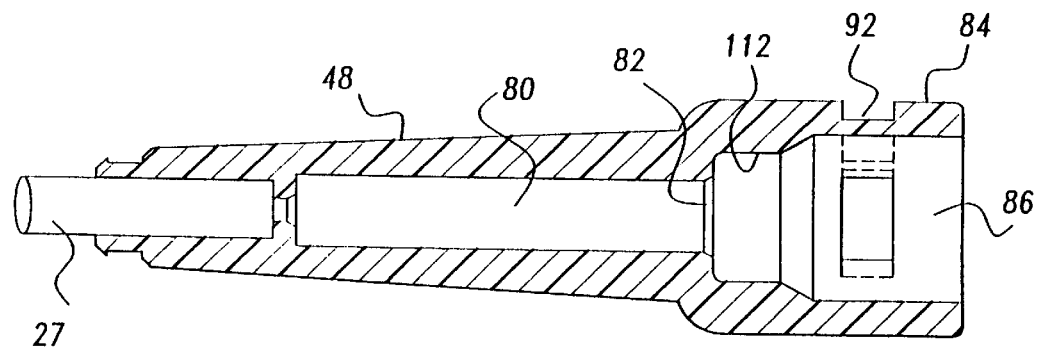
FIG. 5a is a sectional view taken along lines 5a—5a of FIG. 5.
Figure 6:
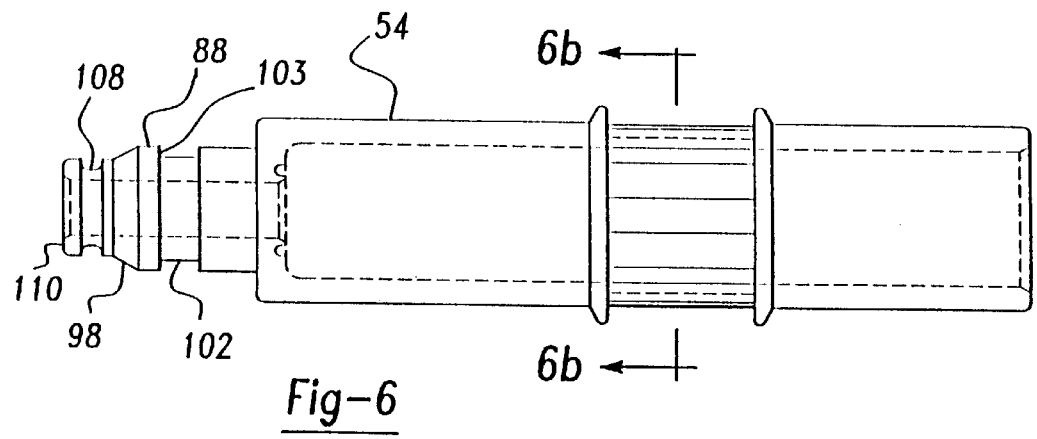
FIG. 6 is a top view of a housing connector of the cable assembly of FIG. 2.
Figure 8:
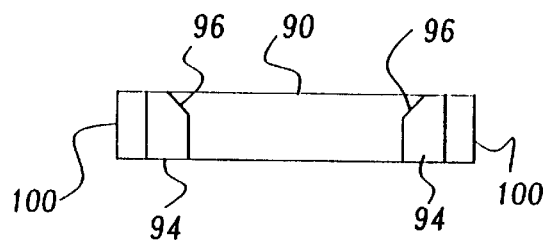
FIG. 8 is a bottom view of a coupling clamp of the cable assembly of FIG. 2.
Figure 8A:
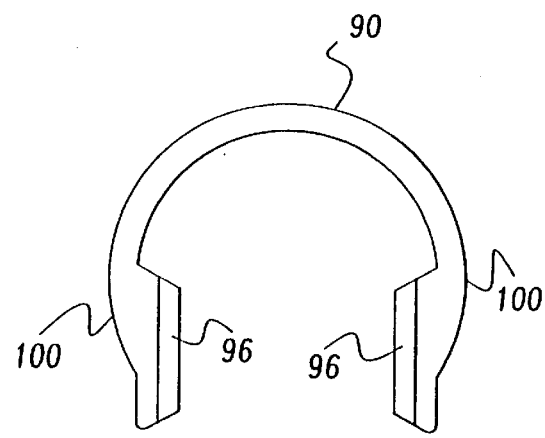
FIG. 8a is an elevational view of the coupling clamp illustrated in FIG. 8.

As set forth above, this procedure interconnects the respective portions of the cable strands 28, 31 for both the transmission portion 26 and shift lever portion 29 of the cable assembly 20. Now, the conduit sections 27, 30 must be connected. Connection of the conduit sections 27, 30 is accomplished by utilizing the coupling end fitting 48, housing connector 54, and slider end fitting 52 as set forth above. The coupling end fitting 48 is attached to the housing connector 54. As shown in FIG. 5a, the coupling end fitting 48 includes a body 80 attached to the conduit 27. The body 80 includes an opening 82 of a size sufficient to receive and allow longitudinal movement of the coupling joint 62 and joint end fitting 64 combination within the body 80. As illustrated in FIG. 4, the cable strands 28, 31 and joint end fittings 64 move longitudinally within the connector assembly 46. A receptacle end 84 on the body 80 forms or includes a socket 86 which receive a plug portion 88 extending outward from the housing connector 54 (see FIGS. 6–6d). A coupling clamp 90 (see FIGS. 8–8a), cooperates with a transverse slot 92 formed in the receptacle end 84 to couple the housing connector 54 to the coupling end fitting 48.

Figure 9:
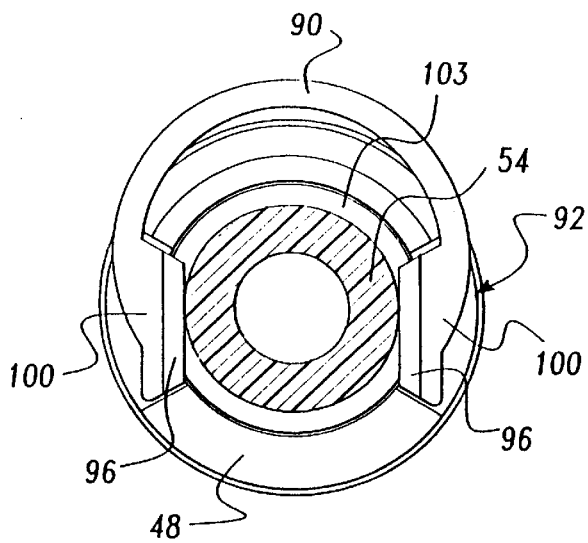
FIG. 9 is a cross-sectional view taken along lines 9—9 of FIG. 3.
Figure 10:
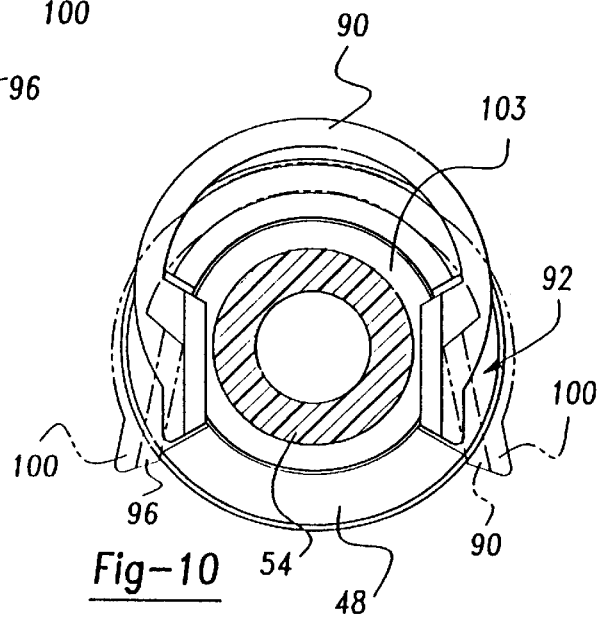
FIG. 10 is a cross-sectional view similar to FIG. 9 illustrating the operation of the coupling clamp of FIG. 8.

In the preferred form, the coupling clamp 90 is installed in the transverse slot 92 of the coupling end fitting 48 prior to installation of the plug portion 88 of the housing connector 54. The coupling clamp 90 includes a load bearing surface 94 and an inclined installation surface 96. The inclined installation surface 96 cooperates with a beveled installation surface 98 of the plug portion 88. As illustrated in FIGS. 9 and 10, when the plug portion 88 is inserted into the socket 86, the inclined and beveled installation surfaces 96, 98 engage causing the legs 100 of the coupling clamp 90 to be deflected outward and spread apart. Once the beveled installation surface 98 on the plug portion 88 clears the legs 100, the legs snap into a lock groove 102 on the housing connector 54 such that the load bearing surface 94 of the coupling clamp 90 engages a shoulder 103 of the lock groove 102 to secure the coupling end fitting 48 to the housing connector 54.

In order to protect the cable strand 28, 31 from the environment, an o-ring 106 positioned on an o-ring groove 108 located on the nose 110 of the plug portion 88 engages an interior seal surface 112 of the coupling end fitting 48. Such a seal prevents entry of contamination and other foreign materials which could affect the longitudinal motion of the cable strands 28, 31.

Turning now to FIG. 7, the slider end fitting 52 for use with the cable assembly 20 is shown. The slider end fitting 52 includes a cylindrical body 120 having a plurality of serrations 121 located along the outer surface thereof. While illustrated herein as cylindrical, the slider end fitting may have any particular cross-section desired, e.g., hexagonal or any other polygonal cross-sections. A passageway 124 is formed in the body 120 and is of a sufficient size suitable to receive the joint end fittings 64 and coupling joint 62 in a manner enabling longitudinal movement of the cable strands 28, 31 within the connector assembly 46 and the slider end fitting 52. One end of the slider end fitting 52 is connected to the conduit 30.

As set forth previously, the slider end fitting 52 is telescopically disposed within the passageway 56 of the housing connector 54. As the slider end fitting 52 moves relative to the housing chamber 54, the overall length of the conduit, and thus the cable strand, may be adjusted. An o-ring 128 (see FIG. 4), is positioned in an o-ring groove 126 and engages an inner surface 128 of the passageway 56 to prevent intrusion of dirt and other foreign materials which could affect motion of the cable strands 28, 31.

As illustrated in FIG. 4, a spring 130 exerts an outwardly directed force upon the slider end fitting 52 to urge the slider end fitting 52 and attached conduit 30 outward thus eliminating or taking up any slack in the cable strands 28, 31. The spring 130 provides an automatic adjustment feature, which upon actuation, adjusts the length and corresponding tension of the cable strands 28, 31.

During pre-assembly, i.e., when the shift lever portion 29 is assembled prior to attachment to the shift lever, the spring 130 is inserted into a spring socket 132 of the slider end fitting 52. The spring 130 and slider end fitting 52 are inserted into the passageway 56 of the housing connector 54 and the spring 130 is compressed until an assembly groove 134 is aligned with a pair of lock tangs 136 extending from the locking clip 58. As illustrated in FIG. 13, the lock tangs 136 prevent movement of the slider end fitting 52 during connection of the housing connector 54 with the coupling end fitting 48 which connects the transmission portion 26 of the cable assembly 20 to the shift lever portion 29 of the cable assembly 20.

While the plurality of serrations are shown in FIG. 7a as a plurality of individual tooth members 123 having inclined surfaces 125 on both sides, the tooth members may also be formed in different alignments, specifically, each tooth 123 may be formed to include a flat bearing surface transverse the longitudinal axis of the slide end fitting 52 on one side and having a ratchet or guide surface inclined in one direction and generally transverse the longitudinal axis of the slide end fitting 52 on the other side.

Figure 11:
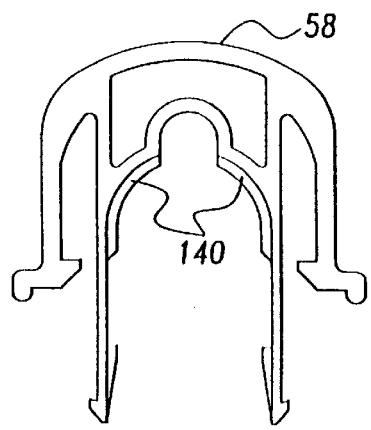
FIG. 11 is an elevational view of a locking clip of the cable assembly of FIG. 2.
Figure 11A:
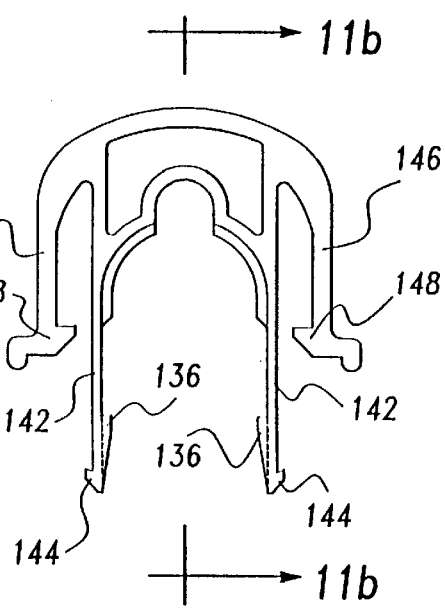
FIG. 11a is a rear view of the locking clip of FIG. 11.
Figure 11B:
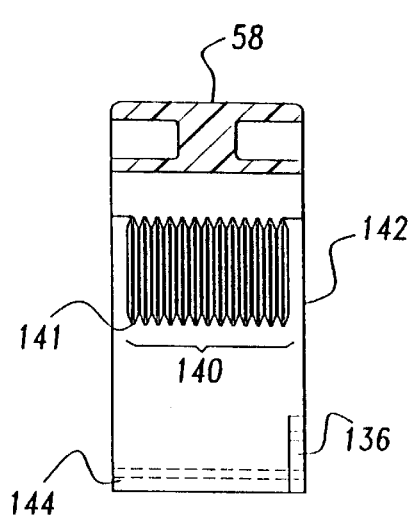
FIG. 11b is a sectional view taken along lines 11b—11b of FIG. 11.

Turning now to FIGS. 11 through 11b, a locking clip 58 for use with the cable assembly 20 of the present invention is illustrated. The locking clip 58 includes a plurality of serrations 140 on a surface thereof. The serrations 140 of the locking clip may comprise a plurality of individual tooth members 141 complementary to the plurality of serrations or individual tooth members 123 located on the outer surface of the slider end fitting 52. The complementary serrations, when engaged, prevent movement of the slider end fitting 52 with respect to the housing connector 54.

Figure 6A:
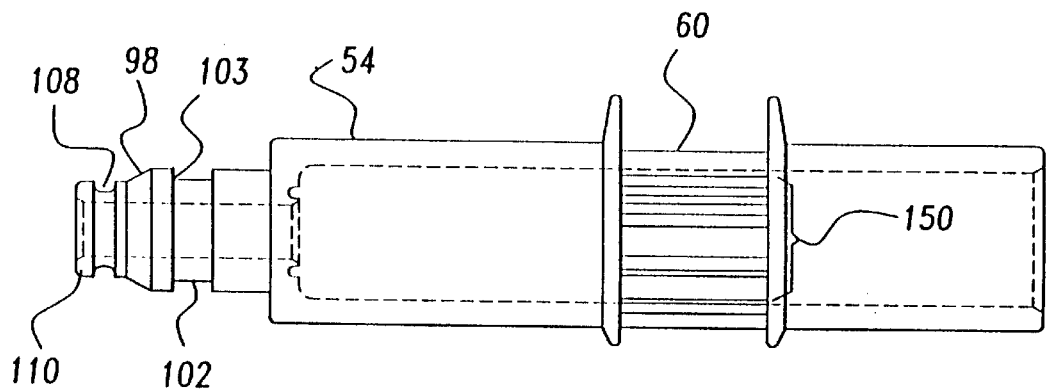
FIG. 6a is an elevational view of the housing connector illustrated in FIG. 6.
Figure 6B:
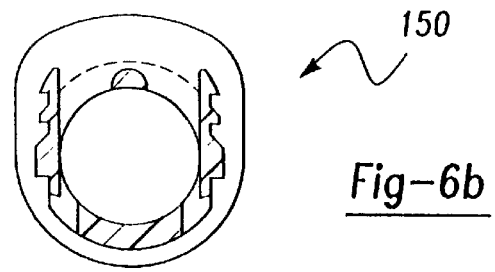
FIG. 6b is a sectional view taken along lines 6b—6b of FIG. 6.

The locking clip 58 further includes several detent mechanisms to retain and couple the locking clip 58 to the housing connector 54. In the illustrated embodiment, a first set of deflectable, resilient fingers 142 having outwardly projecting locking projections 144 on the ends thereof couple the locking clip 58 to the housing connector 54. The locking projections 144 coact with the housing to hold the locking clip 58 on the housing. The locking clip 58 further includes a second set of outwardly deflectable resilient fingers 146 having inwardly projecting locking projections 148 thereon. The inwardly locking projections 148 cooperate with a plurality of retainer bars, seen generally at 150, FIG. 6a, extending along the housing connections 54 adjacent the slot 60 in which the locking clip 58 is mounted. The inwardly projecting locking projections 148 cooperate with the retainer bars 150 to secure the locking clip 58 in several positions along the housing connector 54.

Turning now to FIGS. 13–13b, the various positions of the locking clip 58 in relation to the housing connector 54 and the slider end fitting 52 are illustrated. FIG. 13a illustrates the locking clip positioned in a shipping or assembly position. As illustrated therein, the lock tangs 136 are positioned in the assembly groove 134 and prevent longitudinal movement of the slider end fitting 52 within the housing connector 54. As illustrated therein, the inwardly projecting lock projections 148 engage the undersurface of a first retainer bar 152 to secure the locking clip 58 in the assembly position. After connection of the respective joint end fittings 64 via the coupling joint 62 and the connection of the housing connector 54 to the coupling end fitting 48, the locking clip is depressed for the first time by the operator, wherein the ramp surface 154 on the second retainer bar 156 causes the fingers 146 to be outwardly deflected and pass over the second retainer bar 156. Upon being urged past the second retainer bar 156, the fingers 146 and corresponding inwardly projecting lock projections 148 snap into engagement with the second retainer bar 156 with an audible click thus placing the locking clip 58 in the adjustment position as shown in FIG. 13a. As illustrated therein, the slider end fitting 52 is now free to move longitudinally within the passageway 56 of the housing connector 54 as the lock tangs 136 clear the lock grooves 134. In this position, the spring 130 acts to urge the slider end fitting 52 outwardly along the passageway 56 to adjust the tension in the cable strand 28, 31. Once the cable strand 28, 31 is adjusted, the operator depresses the locking clip 58 a second time, again urging and deflecting the arms 146 outwardly over the ramp surface 160 of the third retainer bar 162 which causes the plurality of serrations 121 on the locking clip 58 to engage the plurality of serrations 140 on the slider end fitting 52 to prevent relative movement between the slider end fitting 52 and the housing connector 54. Once again, the inwardly projecting locking projections 148 snap into place on the third retainer bar 162 with an audible click to inform the operator that the locking clip 58 is engaged with the slider end fitting 52.

The assembly provides a three-position locking clip 58 and retainer bar combination 150 which provides a shipping position, an adjustment position, and a final locking or engagement position. If further adjustment is deemed necessary, the outer deflectable fingers 146 may be withdrawn from the engaged position and the locking clip 58 retracted to allow the spring 132 to further adjust the slider end fitting 52 and correspondingly take up or remove any slack from the cable strand 28, 31.

Figure 14:
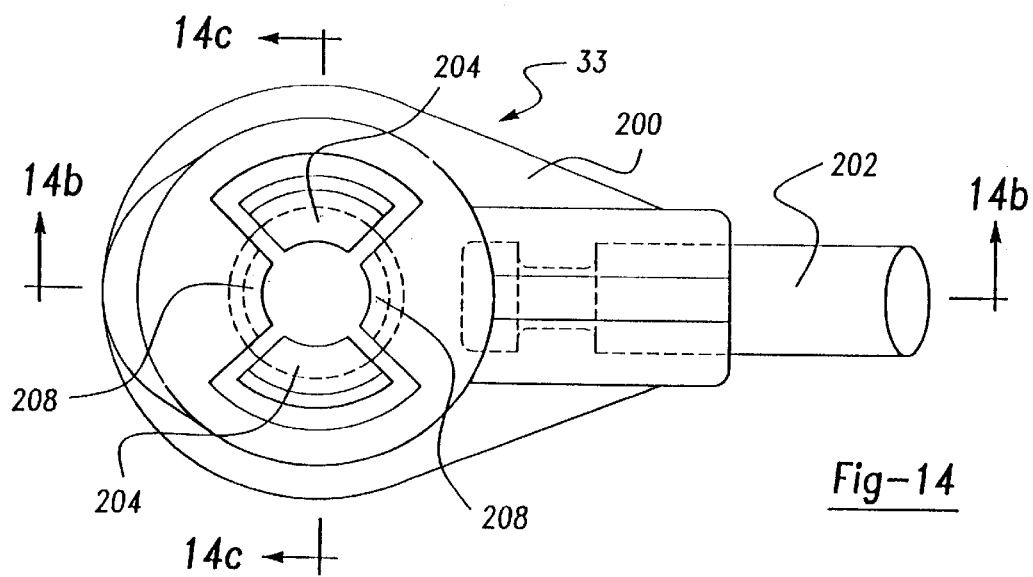
FIG. 14 is a top view of a terminal rod fitting of the cable assembly of FIG. 2.
Figure 14A:
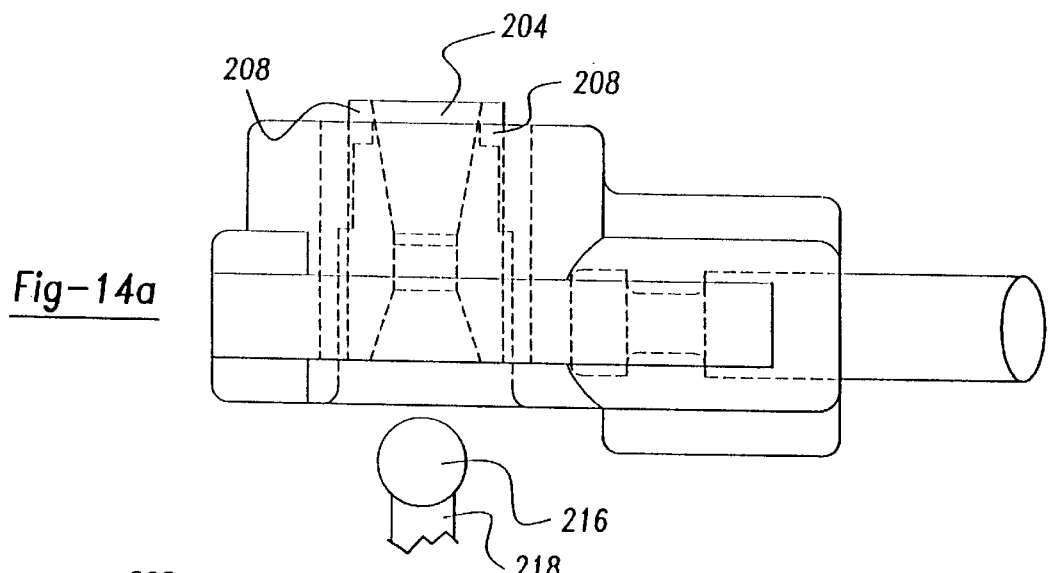
FIG. 14a is a side view of the terminal rod fitting of FIG. 14.
Figure 14B:
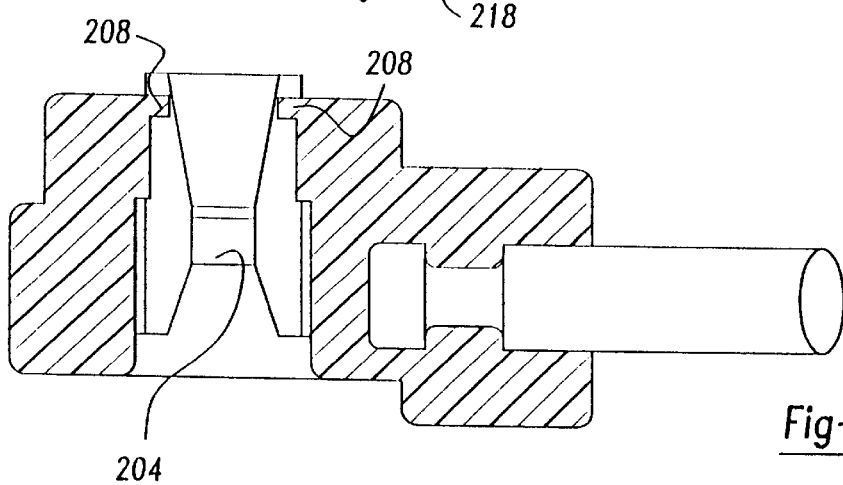
FIG. 14b is a sectional view taken along lines 14b—14b of FIG. 14.
Figure 14C:
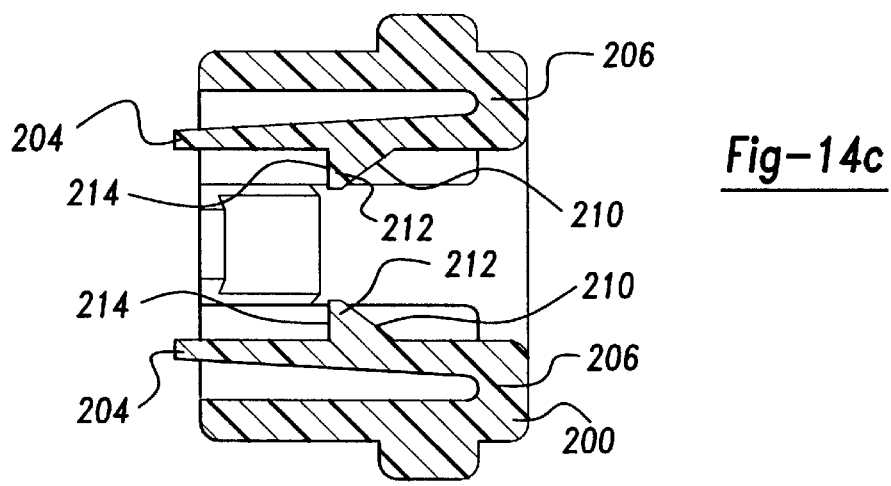
FIG. 14c is a sectional view taken along lines 14c—14c of FIG. 14.
Figure 14D:
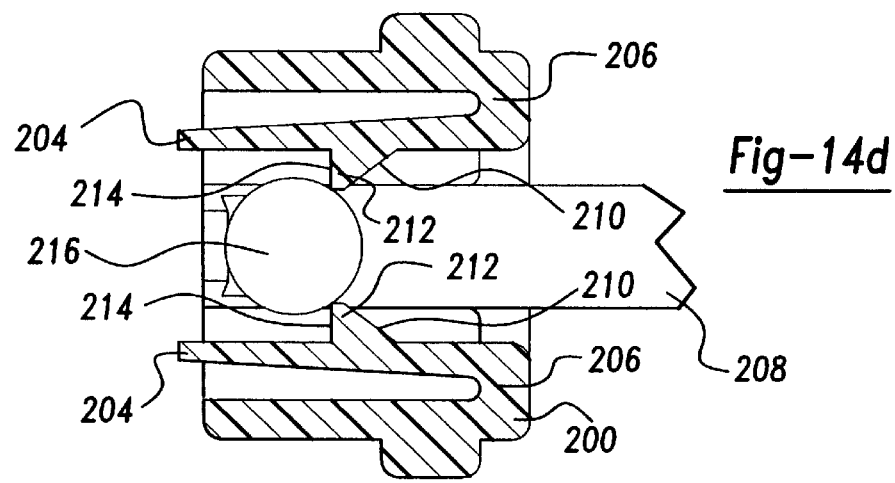
FIG. 14d is a sectional view similarly to FIG. 14c.

Turning to FIGS. 14–14c, a further embodiment of the present invention is illustrated. A terminal rod end fitting 33 for attaching the cable end to either the transmission control arm or shift lever is shown. The terminal rod fitting 33 includes a body portion 200 connected to a rod member 202 and a socket portion 220. The rod member 202 is connected to the cable strand 28, 31 via conventional methods; e.g., crimping. It is important that the terminal rod fitting 33 be installed with an installation force of less than six pounds to prevent actuation or movement of either the shift lever or the control arm than six pounds to prevent actuation or movement of either the shift lever or the control arm connected to the transmission. However, the fitting 33 must maintain at least a twenty-pound retention force to keep the terminal rod fitting 33 attached to a ball stud 216 having a shaft portion 218. This is accomplished through use of a plurality of internal flexible lever arms 204 which are attached to the body 200 via an integral hinge 206. The hinge section 206 of the body allows the lever arm 204 to flex outward to accept the ball stud 216 or other connector placed on the control arm of the transmission. As illustrated in FIG. 14b, the terminal rod fitting 33 includes a pair of bosses 208 which prevent backwards insertion or installation of the fitting 33. In use, the fitting is installed such that the ball stud engages the ramp surfaces 210 on the lock projections 212 of the lever arms 204. The pressure of the ball stud 216 against the ramp surfaces 210 causes the lever arm 204 to be outwardly deflected until the ball passes the lock projections 212 at which point the lever arms 204 spring inward adjacent the shaft portion 218 to capture the ball stud 216 against the retaining surfaces 214. Upon an attempt to withdraw the ball stud 216 from the connector, the retaining surfaces 214, having pressure exerted upon them, tend to pull the lever arms 204 inward thus preventing withdrawal of the ball stud 216 from the fitting 33.

While only certain embodiments of the present invention have been described, it will be apparent that the present invention, in light of the disclosure set forth above, may have various changes and modifications made without departing from the spirit and scope of the present invention.

What is claimed is:

1. A single piece connector for connecting a cable strand to a ball stud, said single piece connector comprising:
   a body;
   a socket formed in said body, a pair of integral bosses located on an end of said body a pair of internal lever arms adjacent said socket, said lever arms attached to said body by an integral flexible hinge, said lever arms further including lock projections such that when said ball stud is inserted, said lever arms are deflected outward whereby the lock projections clear a ball portion and engage a shaft portion of the ball stud, thus retaining the ball stud within the socket.

2. A connector as set forth in claim 1 wherein said lock projections further include ramp surfaces, said ramp surfaces operative to engage said ball stud and assist in deflecting said lever arms outward.

* * * * *